US006381103B1

(12) United States Patent
Misso et al.

(10) Patent No.: US 6,381,103 B1
(45) Date of Patent: Apr. 30, 2002

(54) MAGNETIC LATCHING FOR A DISC DRIVE

(75) Inventors: Nigel F. Misso, Bethany; Steve S. Eckerd, Oklahoma City, both of OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/475,787

(22) Filed: Dec. 30, 1999

Related U.S. Application Data
(60) Provisional application No. 60/140,857, filed on Jun. 24, 1999.

(51) Int. Cl.[7] ................................................ G11B 5/54
(52) U.S. Cl. ................................................... 360/256.2
(58) Field of Search ............................ 360/256, 256.2, 360/256.3, 256.5, 256.6

(56) References Cited

U.S. PATENT DOCUMENTS

| 5,208,713 A | * | 5/1993 | Lindsay et al. ............. 360/105 |
| 5,363,261 A | | 11/1994 | Eckberg et al. |
| 5,369,538 A | * | 11/1994 | Moe et al. .................. 360/106 |
| 5,381,290 A | * | 1/1995 | Cheng ........................ 360/105 |
| 5,404,257 A | | 4/1995 | Alt |
| 5,581,424 A | | 12/1996 | Dunfield et al. |
| 5,666,244 A | | 9/1997 | Ogawa |
| 5,734,527 A | | 3/1998 | Reinhart |

FOREIGN PATENT DOCUMENTS

| DE | 44 18 606 A1 | 12/1994 |
| EP | 0 834 870 A1 | 4/1998 |

OTHER PUBLICATIONS

"A Bistable, Zero Steady–State Power, Rotary–Actuator Lock for DASD", *IBM Technical Disclosure Bulletin*, vol. 36, No. 3, Mar. 1993, pp. 7–9.

* cited by examiner

*Primary Examiner*—William Klimowicz
(74) *Attorney, Agent, or Firm*—Westman, Champlin & Kelly, P.A.

(57) ABSTRACT

A latching method and a latch for a voice coil motor in a disc drive. The latch has a hub and a latch surface. The latch surface has a rotational latching range in which the latch surface latches the voice coil motor. A first magnetic detent is coupled to the hub and is active when the latch surface is in a first rotational segment in the latching range. A second magnetic detent couples to the hub and is active when the latch surface is in an offset second rotational segment in the latching range. The offset shapes detent torque over the latching range.

14 Claims, 6 Drawing Sheets

US 6,381,103 B1

MAGNETIC LATCHING FOR A DISC DRIVE

REFERENCE TO CO-PENDING APPLICATION

This application claims priority benefits from U.S. Provisional Patent Application Ser. No. 60/140,857, which is entitled TWO BALL INERTIA LATCH and was filed on Jun. 24, 1999.

BACKGROUND OF THE INVENTION

In magnetic disc drives, a voice coil motor is used to position the transducer heads over a desired radial position on a stack of magnetic discs that store information. When the disc drive is energized and the discs are spinning, the voice coil motor positions the heads over data stored on the spinning discs. The spinning generates an air bearing separating the heads from the spinning discs. When the disc drive is de-energized and the discs stop spinning, there is no air bearing and the heads contact the smooth stationary discs. If the sticking friction ("stiction") between the heads and the discs is too great, the spindle motor may be incapable of rotating the discs when the disc drive is restarted. A common method of avoiding this problem is to move the heads with the voice coil motor to a "park" portion of the discs when the disc drive is de-energized. The park portion of the disk is textured so that it will not stick to the heads, and no data is stored on the part portion. Various kinds of latches are used to latch the voice coil motor in this park position when the disc drive is de-energized. A magnetic latch shown in U.S. Pat. No. 5,734,527 to Reinhard, for example, comprises a latch with magnetically soft stainless steel balls that interact with the fringe fields in an air gap of the voice coil motor and provides one magnetic ball for latching, and second magnetic ball for unlatching.

As voice coil motors are designed smaller with narrower air gaps, the diameter of a detent ball that will fit in the gap is correspondingly reduced. When the air gap and the ball diameter are reduced by about 25%, the volume or mass of magnetic material in the ball goes down by about 58%. The detent torque, which is related to the mass of magnetic material in the ball, drops off with the smaller ball. The detent torque becomes lower and is active over a narrower range with a smaller detent ball. The magnitude and shape of the torque over a rotational range becomes inadequate to hold the voice coil in the latched position under conditions of vibration. A magnetic latch detent and latching method are needed that will fit in narrower air gaps and that can be shaped over the rotational range to provide adequate detent torque.

SUMMARY OF THE INVENTION

A first latch for a voice coil motor in a disc drive is disclosed. The latch includes first and second magnetic detents that are active in corresponding first and second rotational segments, offset from one another, in a rotational latching range. The selected offset shapes the detent torque over the latching range. The latch has a hub coupled to the magnetic detents and includes a latch surface that latches the voice coil motor. The detent torque is shaped by the offset to provide torque over a selected rotational range. The detent torque is increased by the use of multiple magnetic detents. Smaller detents can be used that fit in a narrower air gap and collectively provide adequate detent torque.

A magnetic detenting arrangement is also disclosed. A hub couples to the detenting arrangement and has a latch surface. The latch surface has a rotational latching range in which the latch surface latches the voice coil motor. The detenting arrangement includes a first magnetic detent that is active when the latch surface is in a first rotational segment in the latching range. The detenting arrangement also includes a second magnetic detent that is active when the latch surface is in a second rotational segment of the latching range. The second rotational segment is offset relative to the first rotational segment. The offset shapes the detent torque over the latching range.

A method of latching a voice coil motor is also disclosed. A latch having a hub and a latch surface is rotationally mounted. The voice coil motor is latched to the latching surface in a rotational latching range of the hub. The hub is magnetically detented relative to voice coil motor magnets with a first magnetic detent that is active when the latch surface is in a first rotational segment in the latching range. The hub is magnetically detented with a second magnetic detent that is active when the latch surface is in a second rotational segment in the latching range that is at a rotational offset from the first rotational segment. The offset shapes the detent torque over the latching range.

DETAILED DESCRIPTION

Figure 1:
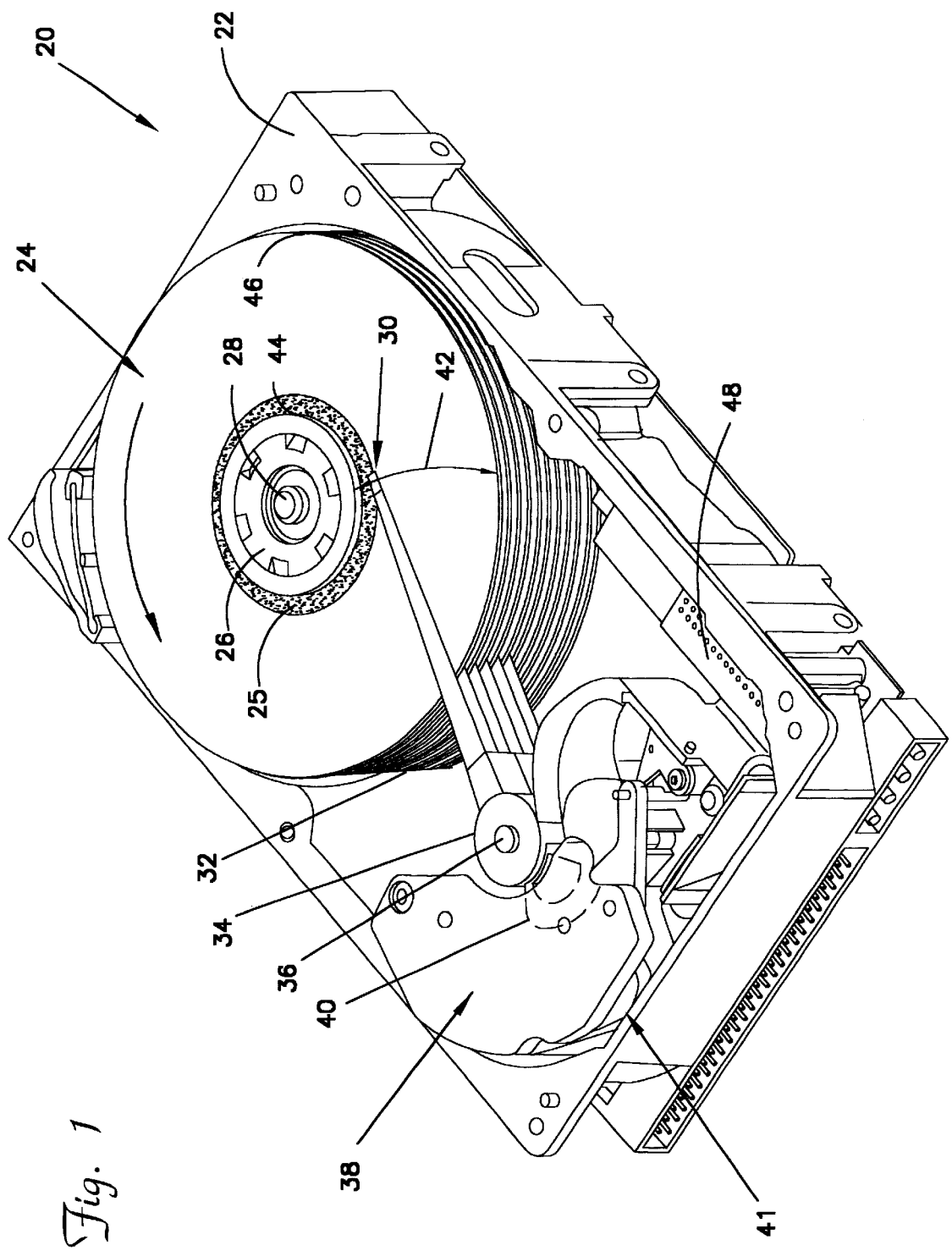
FIG. 1 is a perspective view of an exemplary magnetic disc drive in which the present invention can be used.

FIG. 1 is a perspective view of a magnetic or optical disc drive 20 in which the present invention is useful. Disc drive 20 includes a housing with a base 22 and a top cover (not shown). Disc drive 20 further includes a disc pack 24, which is mounted on a spindle motor (not shown), by a disc clamp 26. Disc pack 24 includes a plurality of individual discs, which are mounted for corotation about central axis 28. Each disc surface has an associated transducer head 30, which is mounted on a head assembly 32 mounted to disc drive 20 for communication with the disc surfaces. Transducer head 30 can include a read. head, a write head, or both a read and a write head. Each disc surface further includes a park surface 25, which is textured, for parking transducer head 30 when the disc drive 20 is de-energized. Head assembly 32 is mounted to a bearing 34 which is actuated to rotate or pivot on an axle shaft 36, or other pivot point, which is mounted to the base 22. A voice coil motor (VCM), shown generally at 38 actuates a voice coil 40 that is attached to the bearing 34. Voice coil motor 38 rotates bearing 34 with its attached head assembly 32 about the axle shaft 36 to position transducer head 30 over a desired data track along an arcuate path 42 between a disc inner diameter 44 and a disc outer diameter 46. Voice coil motor 38 operates under control of internal circuitry 48. When disc drive 20 is de-energized, the voice coil motor 38 moves the heads to the park surface 25, and a latch, shown generally at 41, latches the voice coil motor in a position that parks the transducer head 30 on the park surface 25.

Figure 2:
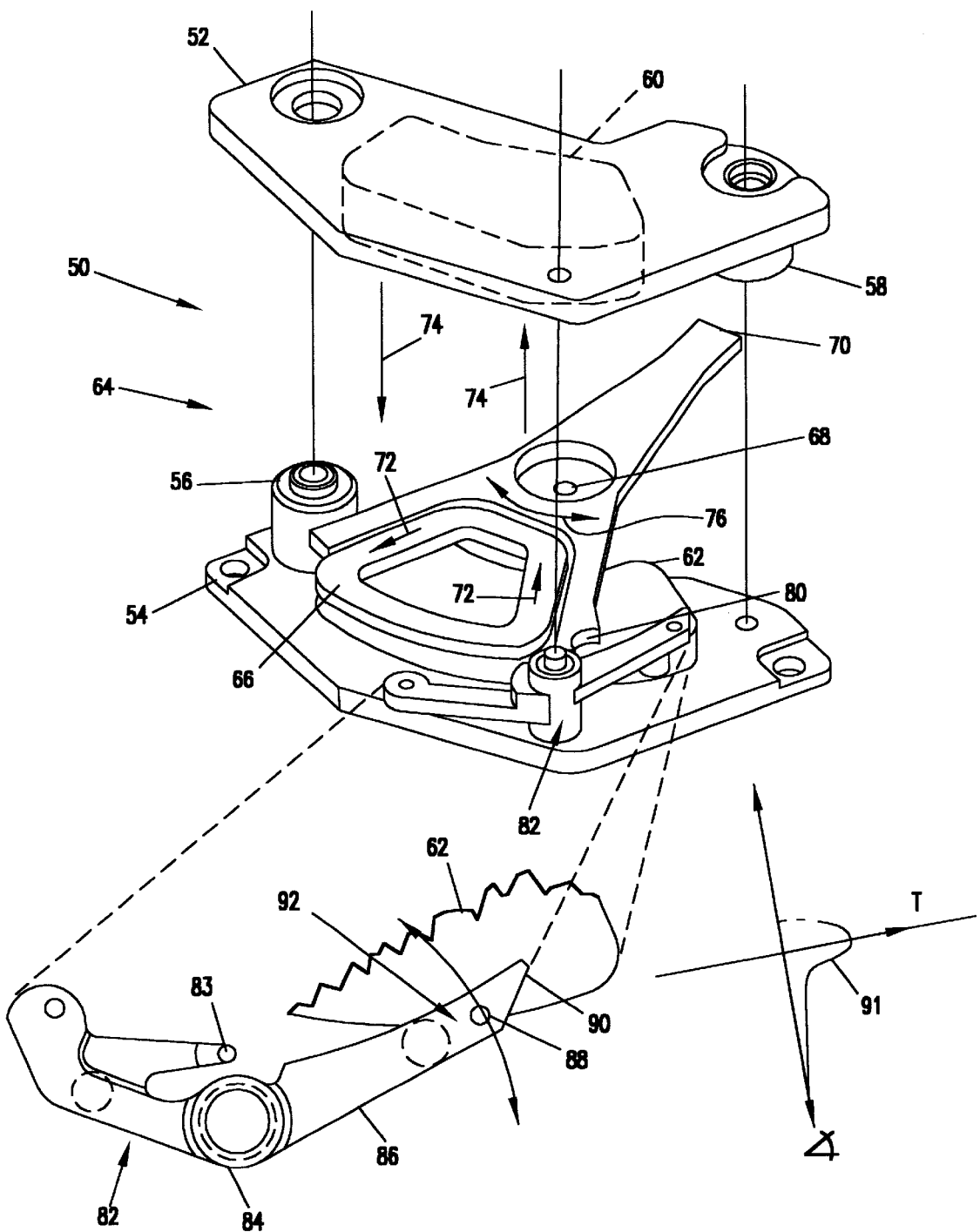
FIG. 2 is an exploded view of a voice coil motor latch with an inset illustration of detent torque as a function of rotational position.

In FIG. 2, an exploded view of a PRIOR ART voice coil motor 50 is shown in more detail. An upper plate 52 and a lower plate 54 are joined together at posts 56, 58. Permanent magnets 60, 62 are joined to the upper plate 52 and lower plate 54 respectively to form an air gap 64 between the permanent magnets 60 (hidden by upper plate 52) and 62. A voice coil 66 is rotationally mounted to an axle 68 and also mounted to transducer heads (not shown in FIG. 2) attached to the end of arm 70. An electric current 72 is passed through voice coil 66. Current 72 interacts with magnetic field 74 in the air gap 64 to rotate the voice coil as shown by arrow 76.

When the transducer heads are to be parked, a current is passed through voice coil 66 with sufficient magnitude so that tab 80 of the voice coil motor engages latch 82. When tab 80 engages latch 82, it applies a torque to latch 82, and latch 82 rotates on latch hub 84 such that latch arm 86 moves toward the air gap 64. A spring pin 83 on latch 82 engages a spring (not shown) that biases the latch toward an unlatched position. A magnetic detent 88 near the distal end 90 of latch arm 86 interacts with a fringing magnetic field 92 near the edge of the air gap 64 between permanent magnets 60, 62. The interaction of magnetic detent 88 with the fringing field exerts a detent force on magnetic detent 88 that, in turn, generates a detent torque on the latch arm 86, holding the latch in the latched position, even when energization current is removed from the voice coil. The magnetic detent 88 is a sphere of magnetic material with a diameter that has been reduced so that it will fit in the narrow air gap 64. Because of the reduced size of magnetic detent 88, the detent torque is limited, and the latch can be disengaged by strong vibration. The detent torque T is illustrated at 91 as a function of angular position of the latch 84 relative to the edges of permanent magnets 60, 62. When the latch is disengaged by vibration, the transducer head can move to the smooth portion of the stationary magnetic disc and cause damage.

Figure 3:
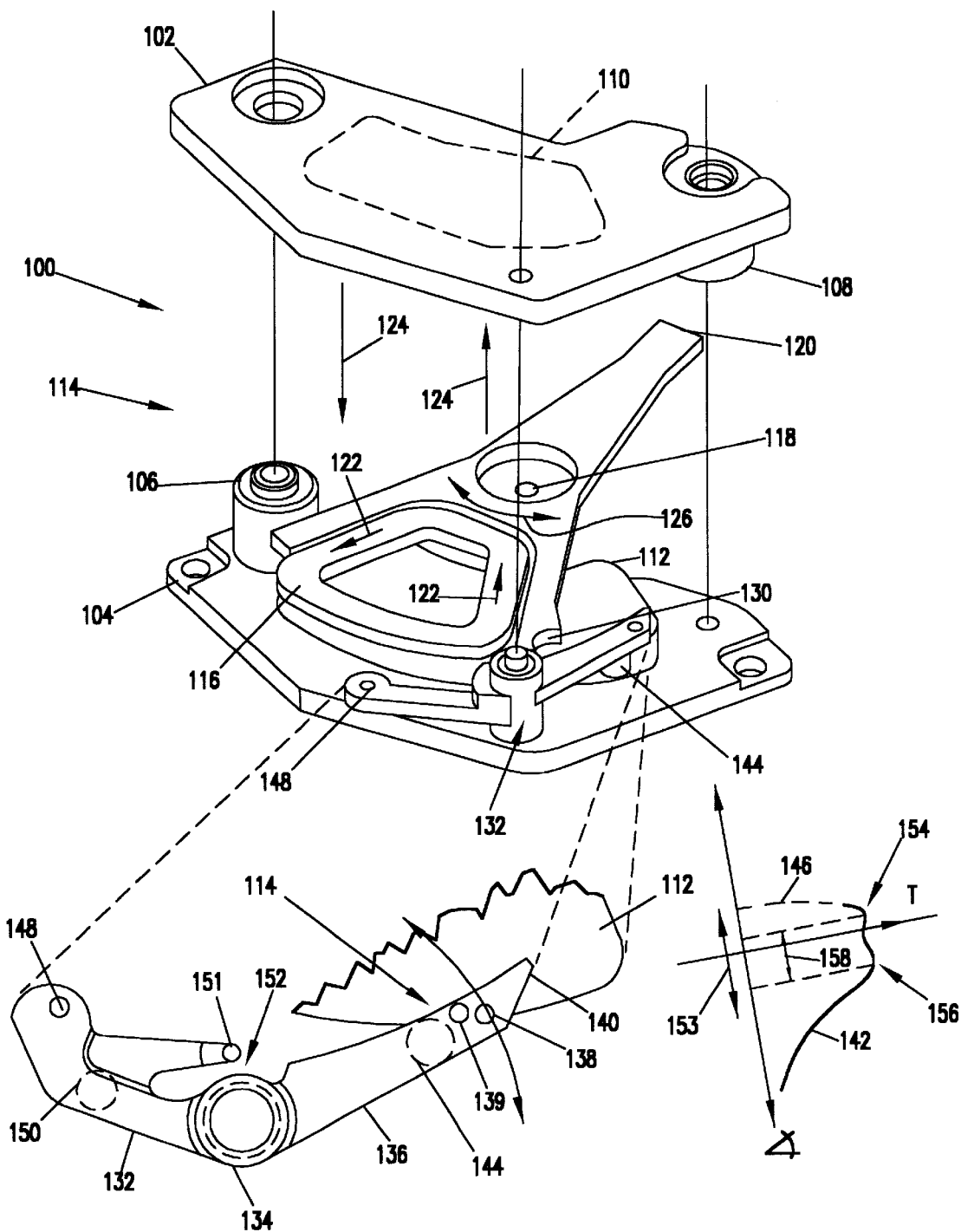
FIG. 3 is an exploded view of an embodiment of an improved voice coil motor latch with an inset illustration of detent torques as a function of rotational position.

In FIG. 3, an exploded view of an embodiment of a voice coil motor 100 is shown in more detail. An upper plate 102 and a lower plate 104 are joined together at posts 106, 108. Permanent magnets 110, 112 are joined to the upper plate 102 and lower plate 104 to form a narrow air gap 114 between the permanent magnets 110, 112. A voice coil 116 is rotationally mounted to an axle 118 and also mounted to transducer heads (not shown in FIG. 3) attached to the end of arm 120. An electric current 122 is passed through voice coil 116. Current 122 interacts with magnetic field 124 in the air gap 114 to rotate the voice coil 116 as shown by arrow 126.

In FIG. 3, when the transducer heads are to be parked, a current is passed through voice coil 116 with sufficient magnitude so that tab 130 of the voice coil motor engages latch 132. When tab 130 engages latch 132, it applies a torque to latch 132 and latch 132 rotates on latch hub 134 such that latch arm 136 moves toward the air gap 114. First and second magnetic detents 138, 139 near the distal end 140 of latch arm 136 interact with a fringing magnetic field near the edge of the air gap 114 between permanent magnets 110, 112. The interaction of magnetic detents 138, 139 with the fringing field exerts detent forces on magnetic detent 138, 139 that, in turn, generates a detent torques on the latch arm 86, holding the latch in the latched position, even when energization current is removed from the voice coil. The magnetic detents 138, 139 are spheres of magnetic material with a diameter that has been reduced so that it will fit in the narrow air gap. Because of the use multiple magnetic detents 138, 139, the detent torque is increased, and the latch is held by the magnetic detents 138, 139, even when there is strong vibration. Damage to the magnetic discs is avoided. In FIG. 3, the torque T as a function of angular position of the latch is illustrated at 142. The magnetic detents 138, 139 are rotationally offset from each other and interact with the fringing field at slightly different rotational angles. The offset that is selected shapes the torque as a function of rotational position. As illustrated at 142, the torque curve can be broadened relative the torque curve of a single magnetic detent illustrated at 91 in FIG. 2. A mechanical stop 144 has a latch overtravel stop surface that bumps up against the edge of permanent magnet 112 and sets a limit 146 on mechanical travel of the latch 132. The hub 134 and latch 132 have a rotational unlatched range. An unlatch magnetic detent 148 is active in the unlatched range and an unlatch mechanical stop 150 can also be used if desired. The unlatch magnetic detent 148 also interacts with a portion of fringing field at an edge of the permanent magnets of the voice coil motor. The unlatch detent 148 holds the latch in an unlatched position so that he voice coil motor is free to move during normal operation. A spring pin 151 engages a spring (not shown) that biases the latch 132 toward an unlatched position.

In FIG. 3, the latch 132 latches the voice coil motor 100 to park the heads 30 (FIG. 1) and avoid damage to disc pack 24 (FIG. 1). The latch 132 has a hub 134 with a latch surface 152. The latch surface 152 has a rotational latching range 153 in which the latch surface 152 engages tab 130 and latches the voice coil motor. The first magnetic detent 138 couples to the hub 134 and is active as illustrated at 154 when the latch surface 152 is in a first rotational segment in the latching range. The second magnetic detent 139 couples to the hub and is active as illustrated at 156 when the latch surface 152 is in a second rotational segment in the latching range that is at a rotational offset 158 from the first rotational segment. The selected amount of offset shapes the detent torque over the latching range 153.

The first and second magnetic detents can comprise spheres formed of magnetic material. Ball bearing formed of type 440C stainless steel with a diameter of about 1.2 millimeters can be used for the, magnetic detents, for example. The body of the latch can be formed of a molded plastic resin to couple the first and second magnetic detents to the hub. The magnetic detents can be formed of any suitable magnetic material ranging from magnetically soft to magnetically hard, depending on the application. The shape of the magnetic detents can range from spherical to elongated, depending on the needs of the application and the width of the available air gap.

Figure 4:
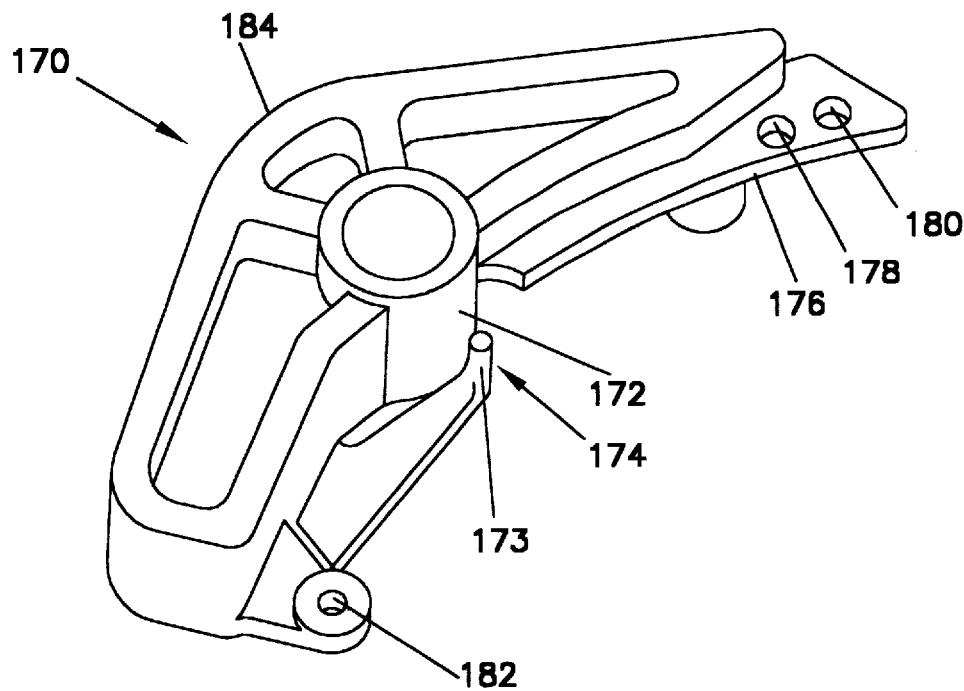
FIG. 4 is a perspective view of an embodiment of a latch for a voice coil motor.

In FIG. 4, a further embodiment of a latch 170 is illustrated with a hub 172 and a latch surface 174. A latch arm 176 extends from hub 172 and includes a first magnetic detent 178 and a second magnetic detent 180. An unlatch detent 182 is also provided. The latch 170 includes additional mass 184 at varying radii and rotational positions to torsionally mass balance the latch around hub 172 to reduce latch vibration torque tending to overcome the detent torque. The mass balancing reduces the amount of detent torque needed for latching. A spring pin 173 engages a spring (not shown) that biases the latch toward an unlatched position.

Figure 5:
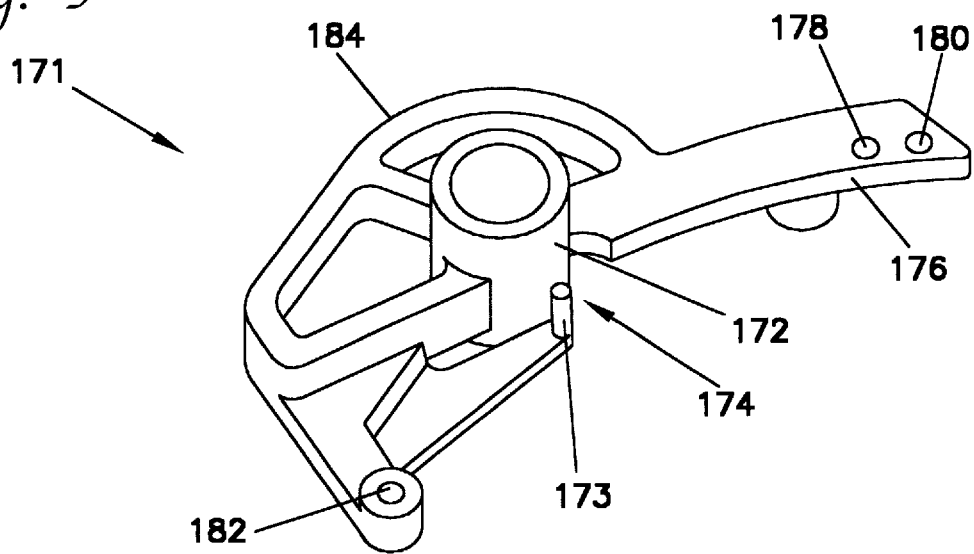
FIG. 5 is a perspective view of an embodiment of a latch for a voice coil motor.

In FIG. 5 a further embodiment of a latch 171 is shown that is similar to latch 170 in FIG. 4 and similar features are identified by the same reference numerals.

Figure 6:
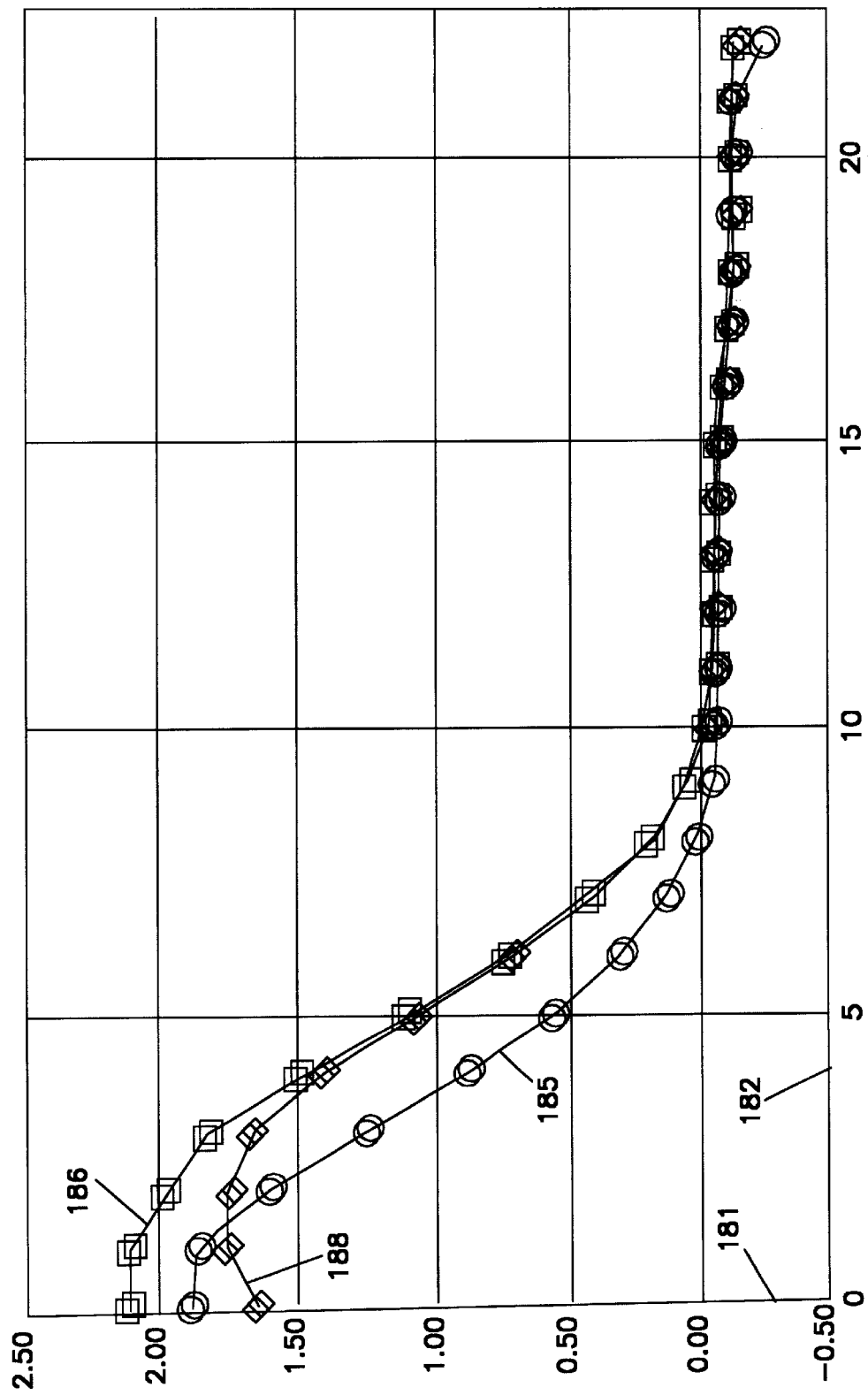
FIG. 6 is a graph of detent torque as a function of rotational position of a latch.

In FIG. 6, a graph of magnetic detent torque as a function of rotational position is shown. Axis 181 represents torque magnitude and axis 182 represents rotational position or angle of the latch relative to the latched position. A first curve 185 (marked by circles) represents detent torque when one larger (about 1.6 millimeter diameter) detent ball is used in a wider air gap. A second curve 186 (marked by squares) represents detent torque when two smaller magnetic detents (about 1.2 mhm diameter) are located in a narrower air gap so there is a small offset between the active positions of the two detents. As can be seen from curve 186, the offset shapes the curve to provide a broader angular range that curve 185 for a detent torque of 1.5 inch-ounces, for example. The detent torque range is broadened by the offset. A third curve 188 represents detent torque when an even wider offset is used between two 1.2 mm diameter balls. The third curve 188 (marked by diamonds) illustrates a broad, relatively flat detent torque over about 3 degrees of angular position.

Figure 7:
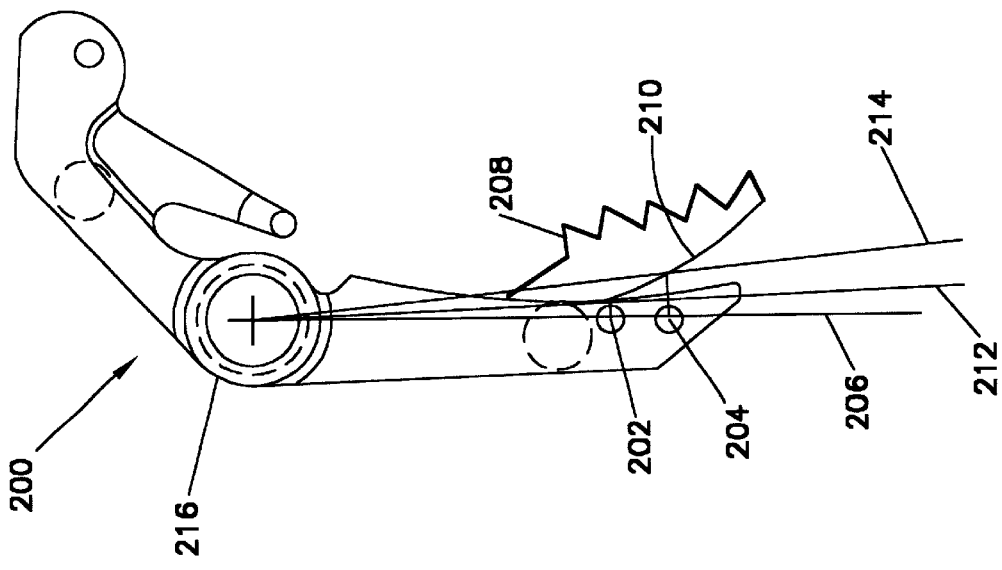

In FIG. 7, a first latch 200 is illustrated with first and second magnetic detents 202, 204 at substantially the same rotation position along radial line 206. A permanent magnet 208 has an edge 210 that is not aligned with any radial line extending from the hub axis, but is offset or tilted relative to such a radial line. When the first magnetic detent 202 is at the edge 210, it lies on a radial line 212. When the second magnetic detent 204 is at the edge 210, it lies on radial line 214 which is offset from radial line 212. In FIG. 7, the offset for latch 200 is accomplished by tilting the permanent magnet edge 210 relative to a radial line extending from the center of hub 216. This tilting can be accomplished by selecting a location for the center axis of hub 216 relative to the curved edge of permanent magnet 208 where it interacts with the magnetic detents 202, 204. The permanent magnets in the voice coil motor generate a first field edge at the first magnetic detent and generates a second field edge at the second magnetic detent, and the second field edge is rotationally offset relative to the first field edge.

Figure 8:
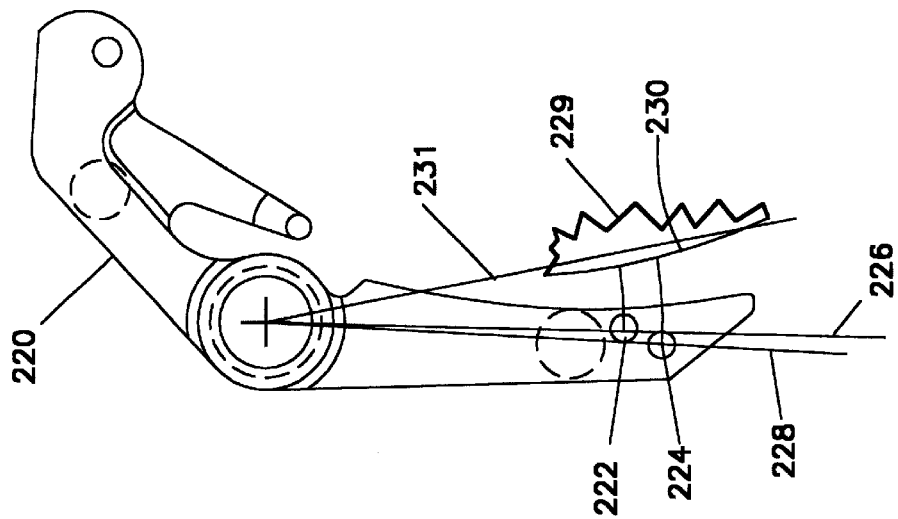
FIGS. 7, 8 are illustrations of embodiments of latches with rotational offsets derived from either offset detents or from offset magnet edges.

In FIG. 8, a latch 220 is also shown. In FIG. 8, the latch 220 is illustrated with first and second magnetic detents 222, 224 at substantially different rotational positions relative to a radial line 226. First magnetic detent 222 is located on radial line 226, however, second magnetic detent 224 is located on a radial line 228 that is rotationally offset from radial line 226. A permanent magnet 229 has a curved edge 230 that is generally aligned with a radial line 231 where it interacts with the magnetic detents 222, 224. When the first magnetic detent 222 is at the edge 230, it lies on a radial line 231, but the second magnetic detent is offset from radial line 231. In FIG. 8, the offset for latch 220 is accomplished by rotationally offsetting the first magnetic detent relative to the second magnetic detent. Offsetting the active positions of the first and second magnetic detents can be done as shown in latch 200 or latch 220 or a combination of both offsetting techniques.

In summary, the present invention provides a latch (132, 170, 171, 200, 220) that latches a voice coil motor (100) to park the heads (30) and avoid damage to disc pack (24). Latch (132, 170, 171, 200) has a hub (134, 172, 216) with a latch surface (152, 174). The latch surface (152, 174) has a rotational latching range (153) in which the latch surface (152, 174) engages tab (130) and latches the voice coil motor. A first magnetic detent (138, 178, 202, 222) couples to the hub (134, 172, 216) and is active as illustrated at (154) when the latch surface (152, 174) is in a first rotational segment in the latching range. A second magnetic detent (139, 180, 204, 224) couples to the hub and is active as illustrated at (156) when the latch surface (152) is in a second rotational segment in the latching range that is at a rotational offset (158) from the first rotational segment. The amount of offset chosen shapes detent torque over the latching range (153).

In one aspect of the invention the offset (158) results when the first magnetic detent (138, 178, 222) is rotationally offset from the second magnetic detent (139, 180, 224). Alternatively, the voice coil motor (100) can generate the offset with a first field edge of a magnet (208) at the first magnetic detent and a second field edge of the magnet (208) at the second magnetic detent, the second field edge being rotationally offset relative to the first field edge. The detent torque range (153) can be broadened by the offset.

In one embodiment, the first and second magnetic detents comprise spheres (138, 139, 178, 180, 202, 204, 222, 224) formed of magnetic material in a molded plastic resin latch body (132, 170, 171) that couples the first and second magnetic detents to the hub (134, 172).

In another embodiment, the latch (82, 170, 171) has a rotational unlatched range and the latch further comprises an unlatch detent (148, 182) active in the unlatched range.

Yet another aspect of the invention is a latch overtravel stop surface (144) on the latch (132).

In further embodiments, the latch (170, 171) is torsionally mass balanced to reduce latch vibration torque tending to overcome the detent torque.

A detenting arrangement (138, 139, 178, 180, 202, 204, 222, 224) for magnetic detenting coupled to a hub (134, 172) is disclosed. The hub has a latch surface (152, 174). The latch surface has a rotational latching range (153) in which the latch surface latches the voice coil motor (100). The detenting arrangement includes a first magnetic detent (138, 178, 202, 222) that is active when the latch surface is in a first rotational segment in the latching range. The detenting arrangement includes a second magnetic detent (139, 180, 204, 224) that is active when the latch surface is in a second rotational segment of the latching range. The second rotational segment is offset (158) relative to the first rotational segment. The offset shapes the detent torque (142) over the latching range.

A method of latching a voice coil motor is also disclosed. The method includes rotationally mounting a latch (132, 170, 171, 200, 220) having a hub (134, 172, 216) and a latch surface (152, 174). The method further includes latching the voice coil motor (100) to the latching surface (152, 174) in a rotational latching range (153) of the hub. The hub is magnetically detented relative to voice coil motor magnets with a first magnetic detent (138, 178, 202, 222) that is active when the latch surface is in a first rotational segment in the latching range. The hub is magnetically detented with a second magnetic detent (139, 180, 204, 224) that is active when the latch surface is in a second rotational segment in the latching range that is at a rotational offset (158) from the first rotational segment. The offset shapes the detent torque over the latching range.

Although the present invention has been described with reference to preferred embodiments, workers skilled in the art will recognize that changes may be made in form and detail without departing from the spirit and scope of the invention.

What is claimed is:

1. A latch for a voice coil motor, comprising:
   a hub having a latch surface, the latch surface having a rotational latching range in which the latch surface latches the voice coil motor;
   a first magnetic detent coupled to the hub and active when the latch surface is in a first rotational segment in the latching range, and a second magnetic detent coupled to the hub and active when the latch surface is in a second rotational segment in the latching range that is at a rotational offset from the first rotational segment, the offset shaping a detent torque for the latch over the latching range.

2. The latch of claim 1 wherein the first magnetic detent is rotationally offset from the second magnetic detent.

3. The latch of claim 1 wherein the voice coil motor generates a first field edge at the first magnetic detent and generates a second field edge at the second magnetic detent, the second field edge being rotationally offset relative to the first field edge.

4. The latch of claim 1 wherein the detent torque range is broadened by the offset.

5. The latch of claim 1 wherein the first and second magnetic detents comprise spheres formed of magnetic material.

6. The latch of claim 1 wherein the latch further comprises a molded plastic resin latch body coupling the first and second magnetic detents to the hub.

7. The latch of claim 6 wherein the hub has a rotational unlatched range and the latch further comprises an unlatch detent active in the unlatched range.

8. The latch of claim 6 wherein the latch body includes a latch overtravel stop surface.

9. The latch of claim 6 wherein the latch is torsionally mass balanced to reduce latch vibration torque tending to overcome the detent torque.

10. A latch for a voice coil motor, comprising:

a hub having a latch surface, the latch surface having a rotational latching range in which the latch surface latches the voice coil motor;

means for magnetic detenting coupled to the hub and including a first magnetic detent that is active when the latch surface is in a first rotational segment in the latching range, and including a second magnetic detent that is active when the latch surface is in a second rotational segment of the latching range, the second rotational segment being offset relative to the first rotational segment, the offset shaping the detent torque over the latching range.

11. A method of latching a voice coil motor, comprising steps of:

(a) rotationally mounting a latch having a hub and a latch surface;

(b) latching the voice coil motor to the latching surface in a rotational latching range of the hub;

(c) magnetically detenting the hub relative to voice coil motor magnets with a first magnetic detent that is active when the latch surface is in a first rotational segment in the latching range, and (d) magnetically detenting the hub with a second magnetic detent that is active when the latch surface is in a second rotational segment in the latching range that is at a rotational offset from the first rotational segment, the offset shaping the detent torque over the latching range.

12. The method of claim 11 and further comprising:

(e) coupling the first and second magnetic detents to the hub with a molded plastic resin latch body.

13. The method of claim 12 and further comprising:

(f) detenting the latch with an unlatch detent active in a rotational unlatched range of the hub.

14. The method of claim 12 and further comprising:

(g) stopping overtravel of the latch with a latch overtravel stop surface formed in the latch body.

\* \* \* \* \*